(12) United States Patent
Lau

(10) Patent No.: US 8,136,257 B2
(45) Date of Patent: Mar. 20, 2012

(54) HAND-HELD POWER TOOL

(75) Inventor: Tak Chiu Alfred Lau, Hong Kong (CN)

(73) Assignee: Senson Investments Limited, New Territories, Hong Kong (CN)

( * ) Notice: Subject to any disclaimer, the term of this patent is extended or adjusted under 35 U.S.C. 154(b) by 374 days.

(21) Appl. No.: 12/439,869

(22) PCT Filed: Sep. 5, 2007

(86) PCT No.: PCT/IB2007/002557
§ 371 (c)(1),
(2), (4) Date: May 20, 2009

(87) PCT Pub. No.: WO2008/029255
PCT Pub. Date: Mar. 13, 2008

(65) Prior Publication Data
US 2009/0241350 A1 Oct. 1, 2009

(30) Foreign Application Priority Data
Sep. 5, 2006 (CN) .................................. 06 1 09880

(51) Int. Cl.
B23D 51/01 (2006.01)
B26B 19/02 (2006.01)
(52) U.S. Cl. ............................. 30/392; 30/216; 30/296.1
(58) Field of Classification Search .................... 30/210, 30/216, 296.1, 382, 392, 276; D8/8
See application file for complete search history.

(56) References Cited

U.S. PATENT DOCUMENTS

| 1,937,586 | A | * | 12/1933 | Ortt | 30/199 |
| 3,236,111 | A | * | 2/1966 | Naslund | 74/50 |
| 3,453,732 | A | * | 7/1969 | Wilkin | 30/296.1 |
| 4,359,822 | A | * | 11/1982 | Kolodziejczyk | 30/296.1 |
| 4,603,478 | A | * | 8/1986 | Anderson | 30/276 |
| 4,785,540 | A | | 11/1988 | Arvidsson | |
| 4,932,126 | A | * | 6/1990 | Pilatowicz et al. | 30/216 |

(Continued)

FOREIGN PATENT DOCUMENTS
DE 298 16 970 U1 1/2000

OTHER PUBLICATIONS
Form PCT/ISA/210 (International Search Report) dated Feb. 26, 2008.

(Continued)

Primary Examiner — Hwei C Payer
(74) Attorney, Agent, or Firm — Buchanan Ingersoll & Rooney PC

(57) ABSTRACT

A cutting tool includes a working member power coupled to a power drive arrangement held by a housing. The housing includes a front housing portion from which the working member protrudes and a rear housing portion. A first handle includes a first hand-grip portion adapted for a user to hold the power tool at an operative level above the ground level, a second handle adapted for a user to generate a turning moment about the first handle so as to vary inclination of the working member relative to the ground level. The second handle includes a movable hand-grip portion which is attached to the rear housing portion. The rear housing portion is pivotally connected to the front housing portion, and the movable hand-grip portion of the second handle is arranged to pivotally move the rear housing portion relative to the front housing portion.

19 Claims, 11 Drawing Sheets

U.S. PATENT DOCUMENTS

| | | | |
|---|---|---|---|
| 4,976,173 A * | 12/1990 | Yang | 81/54 |
| 5,809,653 A * | 9/1998 | Everts et al. | 30/122 |
| 5,832,611 A * | 11/1998 | Schmitz | 30/392 |
| 6,018,939 A | 2/2000 | Nagashima | |
| 6,021,757 A * | 2/2000 | Nagashima | 123/400 |
| 6,182,367 B1 * | 2/2001 | Janczak | 30/392 |
| 6,912,790 B2 * | 7/2005 | James et al. | 30/392 |
| 6,938,706 B2 * | 9/2005 | Ng | 173/216 |
| 7,131,499 B2 * | 11/2006 | Breneman et al. | 172/14 |
| 7,204,026 B2 * | 4/2007 | Phillips et al. | 30/394 |
| 7,401,660 B2 * | 7/2008 | Stones | 173/170 |
| 7,430,807 B2 * | 10/2008 | Saegesser et al. | 30/122 |
| 7,752,760 B2 * | 7/2010 | Baskar et al. | 30/517 |
| 7,866,048 B2 * | 1/2011 | Kodama et al. | 30/216 |
| 7,958,642 B2 * | 6/2011 | Rosskamp | 30/392 |
| 2005/0188552 A1 * | 9/2005 | Gist et al. | 30/392 |
| 2006/0090351 A1 * | 5/2006 | Yoshida | 30/276 |
| 2007/0234579 A1 * | 10/2007 | Patrick | 30/517 |
| 2007/0289148 A1 * | 12/2007 | Zhang et al. | 30/392 |
| 2010/0218386 A1 * | 9/2010 | Ro kamp et al. | 30/277.4 |

OTHER PUBLICATIONS

Form PCT/ISA/237 (Written Opinion of the International Searching Authority) dated Feb. 26, 2008.

Form PCT/IB/373 (International Preliminary Report on Patentability) dated Mar. 10, 2009.

* cited by examiner

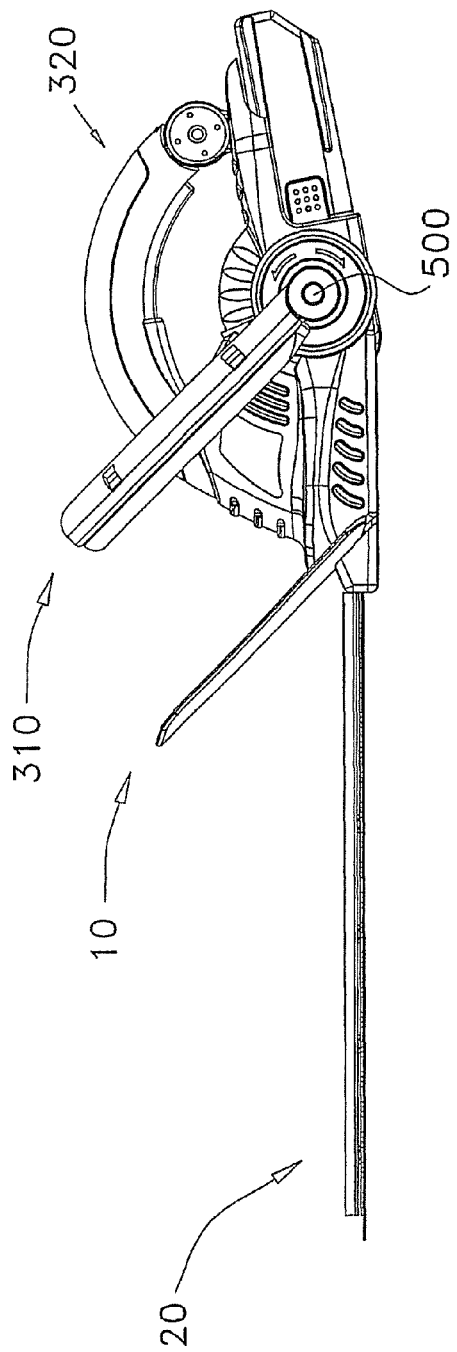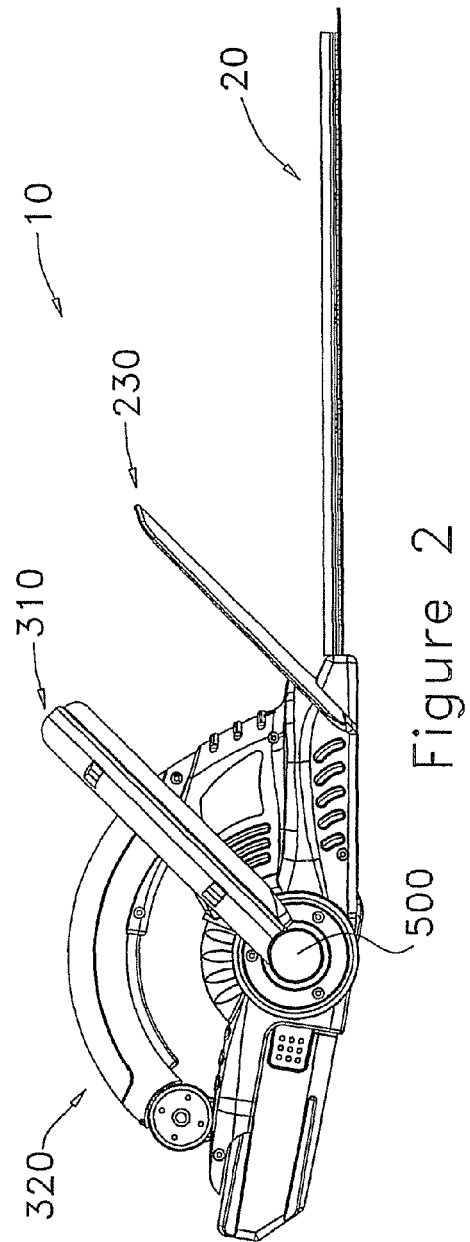
Figure 1
Figure 2

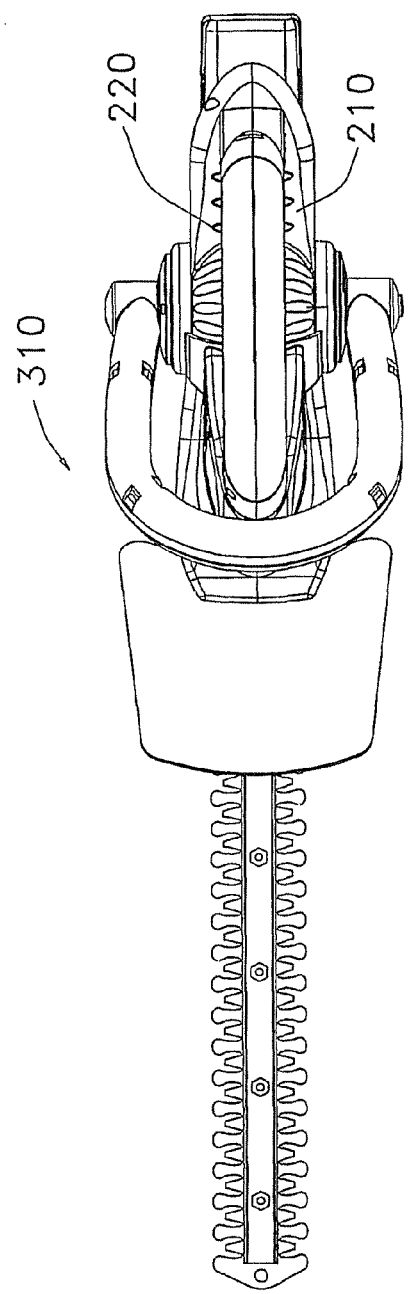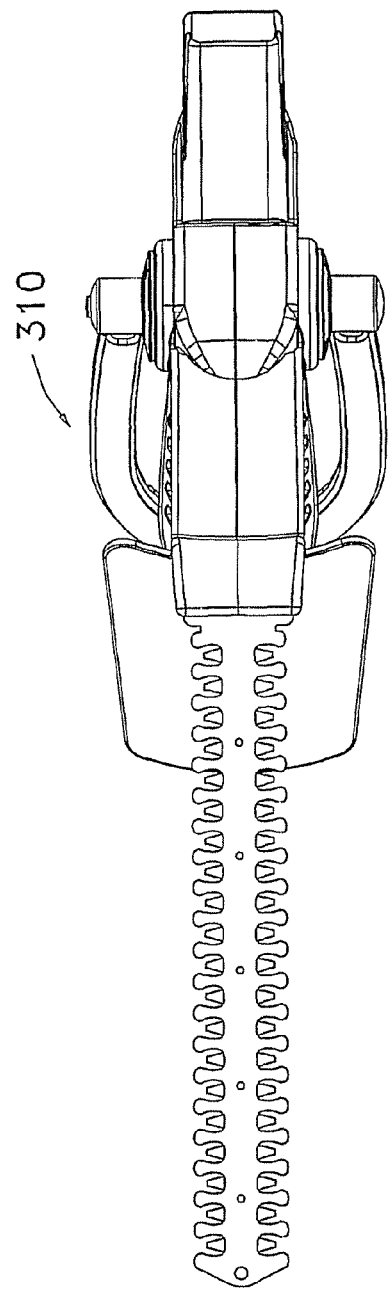

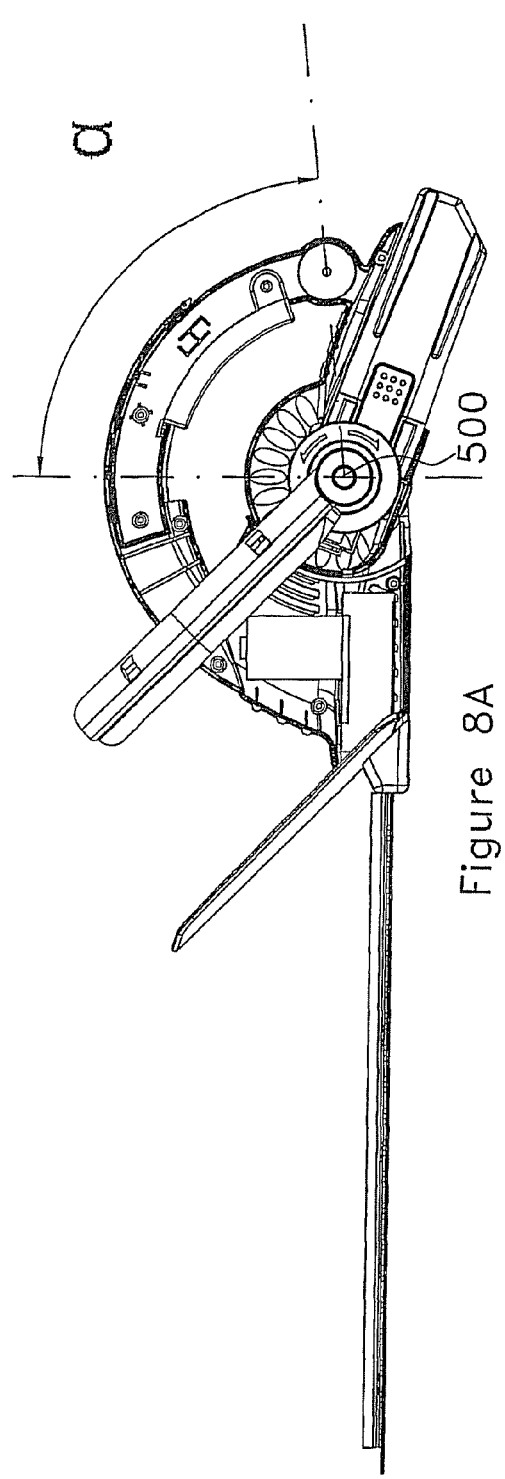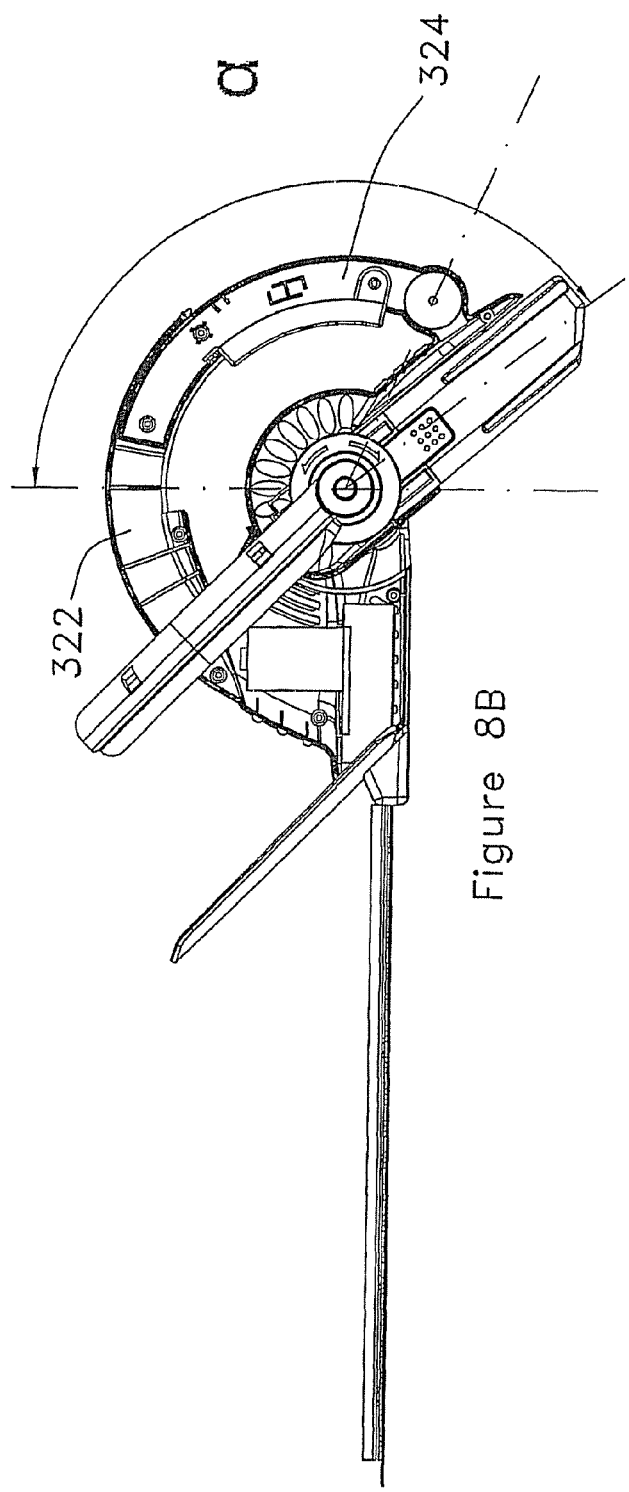

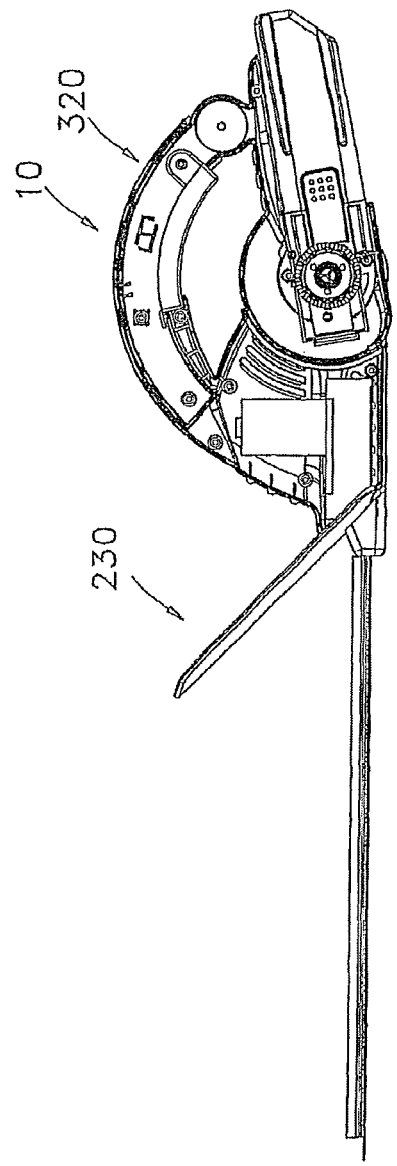
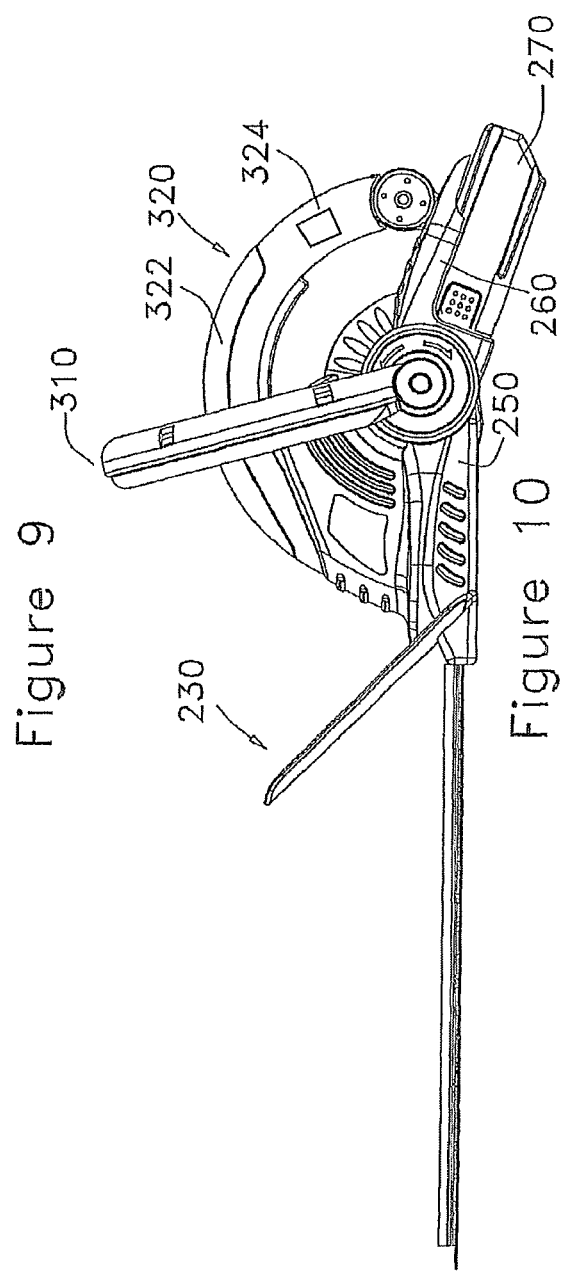

HAND-HELD POWER TOOL

FIELD OF THE INVENTION

The present invention relates to hand-held power tools, and more particularly, to hand-held power cutting tools. More specifically, this invention relates to hand-held power cutting tools with an elongate cutting means.

BACKGROUND OF THE INVENTION

Hand-held power tools are widely used both in industries and at homes. Commonly known hand-held power tools include chain saws, hedge trimmers, drills (e.g., electric or pneumatic), power wrench (e.g., electric or pneumatic), saws and the like.

Such hand-held power tools are usually quite heavy and typically comprise a handle for holding the power tool at an operating level which is above the ground. When a power tool is held in a normal operating which is above the ground, a power coupled movable part, for example, a cutting blade or a drill bit, will protrude away from a user for engaging with an object distal from a user. The vertical operating levels of a power tool can vary significantly according to specific or instantaneous modes of applications. For example, a power tool may need to be held near the ground level or to be held well above the head of a user for overhead applications, for example, for trimming tall trees or for drilling holes on high walls.

A power tool is usually quite heavy and is usually ergonomically designed for use at a particular operation level above the ground level. A user always finds it very uncomfortable, and sometimes even awkward, to use a power tool at an operating level away from the operating level for which the power tool is ergonomically designed. Typically, such a level is usually very high or very low relative to the height of a user. The discomfort would become especially apparent and unbearable when a user has to operate the power tool for a more extended period of time, for example, for more than 20-30 minutes or even hours. Therefore, it will be highly desirable if there can be provided power tools which would mitigate the discomfort due to conventional designs of power tools as mentioned above.

SUMMARY OF THE INVENTION

According to the present invention, there is provided a power tool comprising a working member power coupled to a power drive arrangement held by a housing, said housing comprising a front housing portion from which said working member protrudes and a rear housing portion, a first handle comprising a first hand-grip portion adapted for a user to hold said power tool at an operative level above the ground level, a second handle adapted for a user to generate a turning moment about said first handle so as to vary inclination of said working member relative to the ground level, said second handle comprising a movable hand-grip portion which is attached to said rear housing portion, characterized in that said rear housing portion is pivotally connected to said front housing portion, and said movable hand-grip portion of said second handle is arranged to pivotally move said rear housing portion relative to said front housing portion The movable hand-grip portion permits a user to select a preferred handle configuration. At the same time, the counterweight associated with the rear housing portion will enable a user to align the working member with the object to be engaged with less effort.

The power drive arrangement comprises a front portion and a rear portion which are respectively housed by said front housing portion and said rear housing portion.

By distributing the power drive arrangement respectively on the front and rear housing portions, a portion of the power drive arrangement, which usually accounts for a substantial portion of the weight of the tool, can be utilized as a counterweight.

For example, the front and rear portion of said power drive arrangement may be pivotally joined and share a common pivotal axis with said housing The portable power source may be a battery held by said rear housing portion and a power driving mechanism operable by said portable power source is held by said front housing portion. Since a battery is usually the single heaviest component of a power tool, and is usually detachably mounted to the tool, a battery would serve as a convenient counterweight.

The battery may be arranged to provide a counterweight against the weight of said power driving mechanism and said working member, said movable hand-grip portion being arranged to vary the longitudinal distance of said counterweight relative to said pivotal axis of said housing.

In this example, the working member is elongate and said power driving arrangement is arranged for reciprocatingly driving said working member. Of course, this invention is also applicable to a power tool with a non-elongate working member, such as a circular saw.

The working member may be an elongate cutting element having a longitudinal axis, such as a chain saw, a saw blade, and a drill bit. Alternatively, the working member may be a wrench or a socket.

To increase available turning moment, the movable hand-grip portion of said handle portion may be pivotally connected to said rear housing portion near its rear end, the pivotal axes of said movable hand-grip portion of said handle portion and said housing being parallel and orthogonal to the longitudinal axis of said tool.

To provide a more robust handle assembly, the second handle may comprise a fixed handle portion extending arcuately from said front housing portion towards said rear housing portion, said movable handle portion being arcuate and extendible relative to said fixed handle portion.

For simpler construction, the arcuate fixed handle portion and said arcuate movable handle portion of said second handle portion share a common plane and a common centre, said common centre coinciding with the pivotal axis of said housing.

To provide a compact construction, the arcuate movable handle portion of said second handle portion may be telescopically extendible from said fixed handle portion.

In this embodiment, the second handle extends longitudinally from said front housing portion to said rear housing portion. Of course, the second hand may also extend transversely across the housing.

Usually, the rear housing portion is elongate to conform with the shape of a battery and said movable hand-grip portion of said second handle is arranged to vary the inclination of said rear housing portion relative to the longitudinal axis of said working member.

In this example, the first hand-grip portion of said first handle extends transversely across said housing, and above the fixed handle portion. This arrangement permits a user to hold the upper first handle with one hand to elevate the tool above the ground level, and the second handle will permit a user to steer the horizontal orientation of the working member with more ease.

To provide more flexibility, the first handle is pivotally mounted on said housing.

The housing and said first handle may also share a common pivotal axis to further simplify construction.

In this example, the first handle defines a first handle plane and said second handle defines a second handle plane, said second handle plane being orthogonal to said first handle plane.

For an elongate working member having a longitudinal axis, the longitudinal axis of said working member will be on said second handle plane. Of course, the handle plane may be parallel.

The pivotal axes of said first handle, said second handle and said housing are common.

The movable hand-grip portion of said second handle may further comprise a laterally extending hand-grip member.

The hand-grip portion of said first handle is on an upper side of said housing, and said movable hand-grip portion of said second handle is movable between above and below said housing.

BRIEF DESCRIPTION OF THE DRAWINGS

A preferred embodiments of the present invention will be explained in further detail below by way of example and with reference to the accompanying drawings, in which:

FIG. 1 shows a first side view of a hedge trimmer illustrating a preferred example of this invention, FIG. 2 shows another side view of the hedge trimmer of FIG. 1, FIG. 3 shows a top plan view of the hedge trimmer of FIG. 1, FIG. 4 shows a bottom plan view of the hedge trimmer of FIG. 1, FIG. 8A depicts the hedge trimmer of FIG. 8 with the first handle at the first angular position and the second handle at a second angular position, FIG. 8B depicts the hedge trimmer of FIG. 8A with the second handle portion at a third angular position, FIG. 9 depicts the hedge trimmer of FIG. 8 with the first handle removed, FIG. 10 illustrates a further alternative configuration of the first handle and the second handle of the hedge trimmer of FIG. 8.

DETAILED DESCRIPTION OF THE PREFERRED EMBODIMENTS

Figure 5:
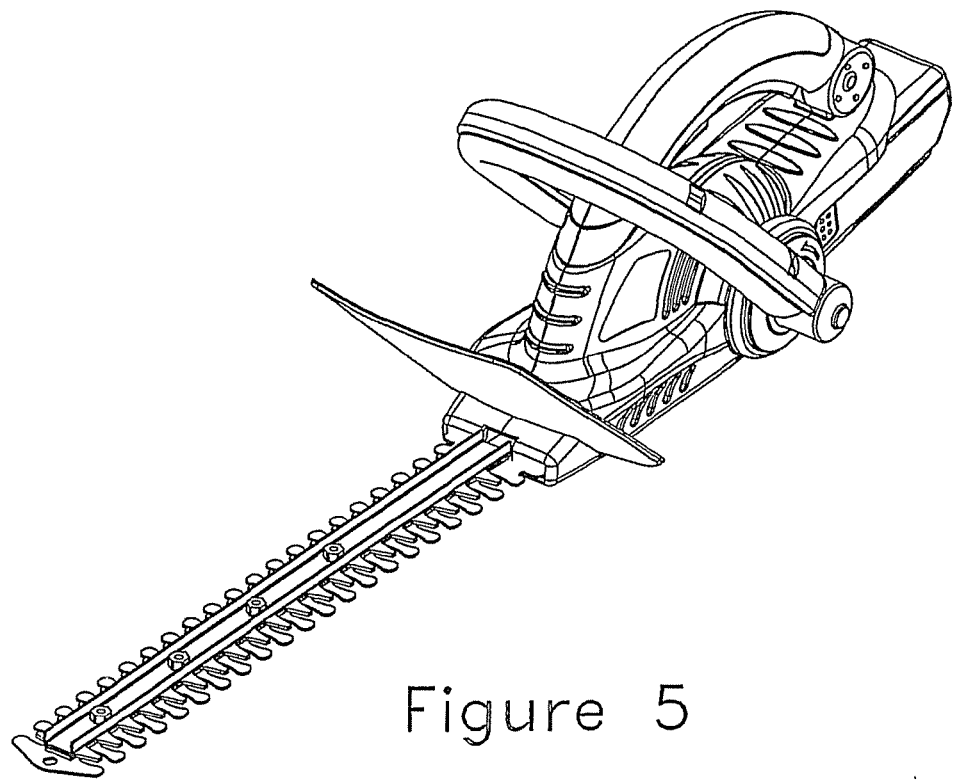
FIG. 5 shows a perspective view of the hedge trimmer of FIG. 1.
Figure 6:
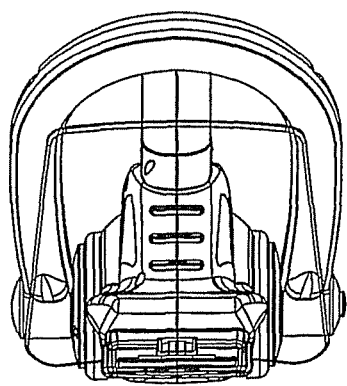
FIG. 6 shows the hedge trimmer of FIG. 1 viewed from a distal end.
Figure 7:
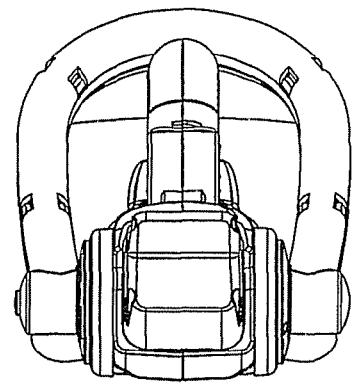
FIG. 7 shows the hedge trimmer of FIG. 1 viewed from a proximal end.

A hedge trimmer 10 is described with reference to the Figures as an example of a hand-held power tool of this invention. The hedge trimmer comprises a power drive arrangement, a working member in the form of a cutting element 20 power coupled to the power drive arrangement, and a pair of force-coupled handles.

The power drive arrangement is for producing reciprocating motion for driving the cutting element and comprises a motor 110 and a motion transmission arrangement 120 which are supported on a rigid housing. In this example of a hedge trimmer, the power drive arrangement is adapted for producing a linear reciprocating motion to drive a movable cutting member relative to a fixed one. Specifically, the motor is supported on the housing with its rotary shaft aligned substantially orthogonal to the direction of the linear reciprocating motion. It will be noted that the direction of the linear reciprocating motion is parallel to the longitudinal axis of the elongate cutting means of the hedge trimmer. The motion transmission arrangement is for converting rotary motion generated by the motor and output by the rotary shaft into a linear reciprocating motion for driving the elongate cutting means along the longitudinal direction. The operating power of the motor is provided by a battery, for example, a rechargeable battery, mounted on the housing to be described in more detail below.

The housing comprises a front housing portion for accommodating a power drive mechanism comprising the motion transmission arrangement, and a rear housing portion for receiving the battery. The front housing portion comprises a rigid chassis on which the power drive mechanism is mounted and a pair of clam shells which is fitted together for enclosing the power drive mechanism so that the moving parts of the power drive mechanism are not easily accessible to a user for safety reasons. The pair of clam shells is moulded from durable plastics and together forms the exterior of the housing. The clam shells are fastened together by releasable fastening means, such as screws so that the clam shells can be removed when services to internal parts are required. For an elongate tool such as a hedge trimmer, the pair of clam shells is formed into two lateral halves (that is, a right clam shell 210 and a left clam shell 220) which are fastened together along a substantially vertical dividing plane which divides the elongate cutting means in two substantially equal lateral halves so that the hedge trimmer is substantially symmetrical along the vertical dividing plane. In addition, a safety guard 230 is also mounted at a distal end of the housing.

To facilitate hand-held operation of the hedge trimmer, a pair of force-coupled handles is provided. The force-coupled handles comprise a first handle 310 and a second handle 320, with the first handle intermediate the cutting member and the second handle. Specifically, the first handle is provided to allow a user to hold the hedge trimmer at an elevated operating level above the ground level and is adapted such that when the hedge trimmer is so held, the distal end of the cutting member is directed away from a user so that the cutting member is ready to engage an object presented thereto. In such an operating position, the housing and the second handle is proximal to a user. The first handle comprises a hand-grip portion which is elevated above the top of the housing and extends transversally or laterally across the housing With a transversal hand-grip, the hedge trimmer will be easily positioned into the operating mode, that is, with the free end of the elongate cutting means (which is an example of a working member) pointing away from a user, when the hedge trimmer is hand lifted by a user. To facilitate convenient operation, the longitudinal position of the hand-grip is just above the centre of gravity of the hedge trimmer. With this hand grip disposition, the elongate body of the hedge trimmer will be substantially leveled when being lifted.

For user friendliness, the first handle is arch-shaped with the hand grip joined to the housing by means of a pair of lateral arms which are hinge joined to the lateral sides of the chassis of the housing. With the hinge joint arrangement, the first handle is pivotally movable about a hinge axis which is parallel to the hand grip portion or orthogonal to the longitudinal direction of the elongate cutting means. In addition, the angular position of the arms can be varied by a user and the longitudinal position of the hand grip portion will be consequentially varied to cause a natural tilting, that is, the tilting of the hedge trimmer due to its own longitudinal weight distribution about the hand grip. For example, when the hand grip is moved forward (by turning the handle anti-clockwisely about the hinge axis) from the leveled position and towards the distal end of the hedge trimmer, the elongate cutting means will tilt upwards due to an increase in proximal weight distribution. On the other hand, when the hand grip is moved backwards (by turning the handle clockwisely about the hinge axis) from the leveled position towards the proximal end of the hedge trimmer, the elongate cutting means will tilt downwards due to an increase in distal weight distribution As an exemplary alternative, the first handle may comprise a T-shaped handle bar with a central bar interconnecting the transversal hand grip and the chassis of the housing. A releasable latching means is provided to lock the handle at a desired angular position. An exemplary latching means may comprise a spring urged teethed wheel which is engage-able with correspondingly shaped indentations on the housing. More specifically, the teethed wheel is spring urged into the locking position and can be released from engagement by pulling away from the hinge joint axle against spring urge.

The second, proximal, handle is located rearwards of the first handle and is adapted to provide controllability and stability of the hedge trimmer during use. More particularly, the first and the second handles are adapted so that when the hedge trimmer is held at an elevated operating level, the hand-grip portion of the first handle will act as a fulcrum about which the distal end of the elongate cutting means can turn when a turning force is applied to the second handle. It will be appreciated that the inclination of the elongate cutting means will be varied by such a turning or rotation about the hand grip of the first handle. Therefore, by providing a pair of longitudinally distributed handles which are force coupled, the elongate cutting means can be tilted to operate at various vertically elevated levels above the ground level according to specific application requirements or personal preference of a suer.

To mitigate limitations of conventional hand-held power tools, a second handle which is movable relative to the first handle and which can be locked at a selected operating position is provided. More particularly, the elevation of the hand-grip portion of the second handle with respect to that of the hand-grip portion of the first handle is adjustable.

Figure 8:
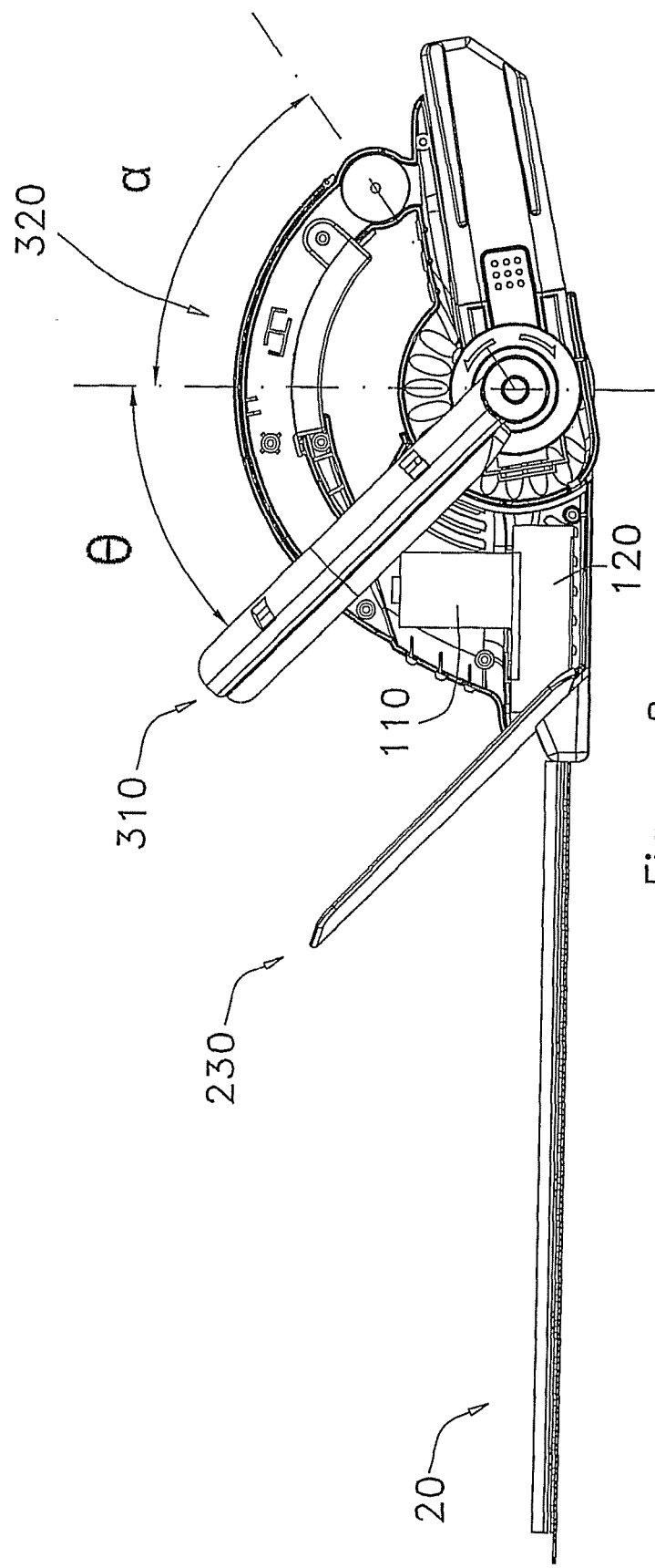
FIG. 8 depicts the hedge trimmer of FIG. 1 with a clam shell of the housing removed, and with the first handle at a first angular position and the second handle at a first angular position.
Figure 8C:
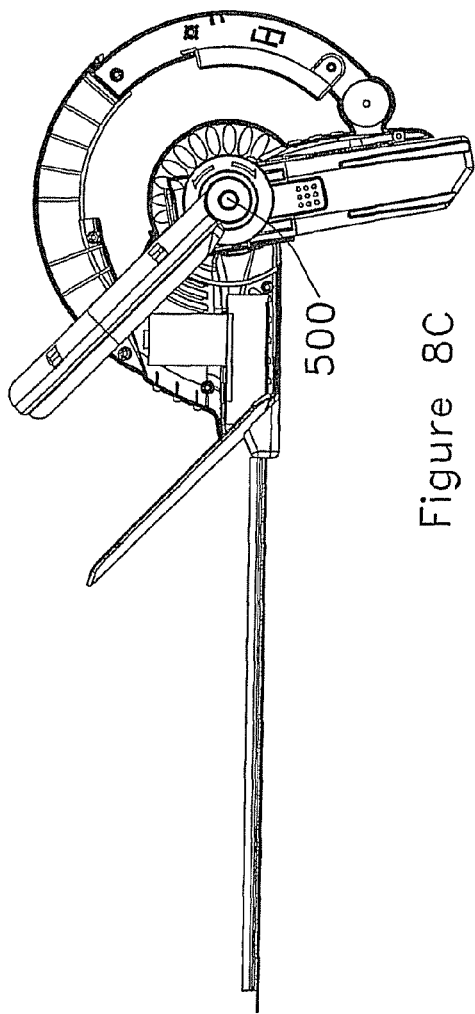
FIG. 8C depicts the hedge trimmer of FIG. 8A with the second handle at a fourth angular position.
Figure 8D:
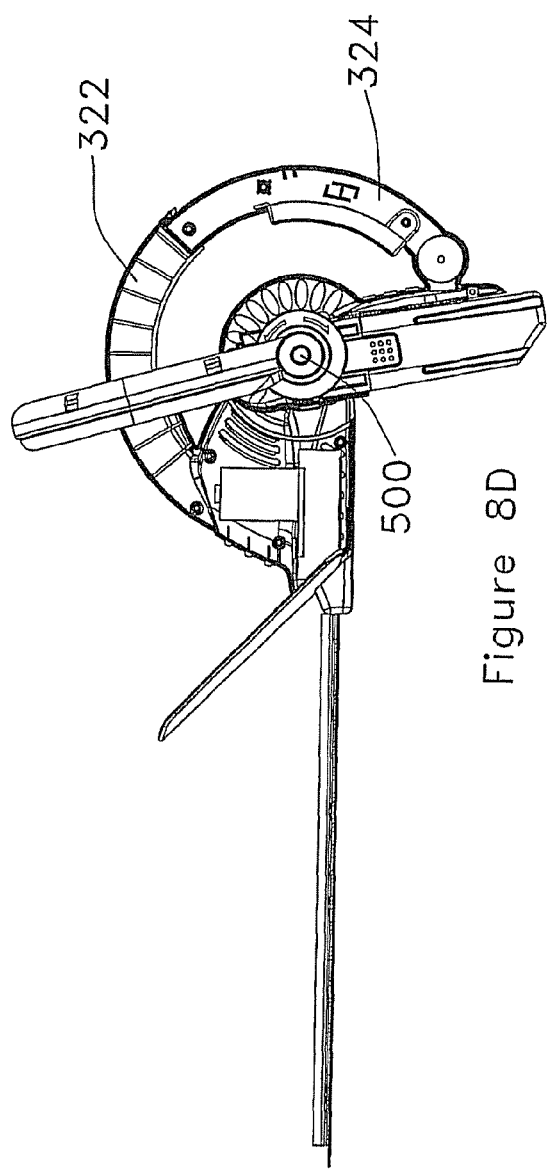
FIG. 8D depicts the hedge trimmer of FIG. 8A with the first handle at the second angular position.
Figure 8E:
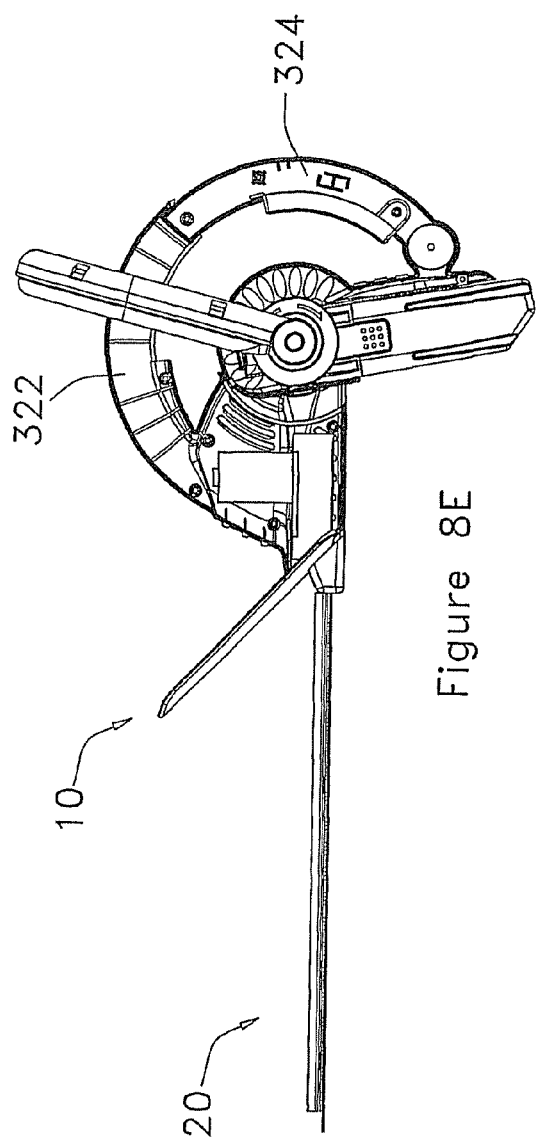
FIG. 8E depicts the hedge trimmer of FIG. 8A with the first handle at the third angular position.
Figure 8F:
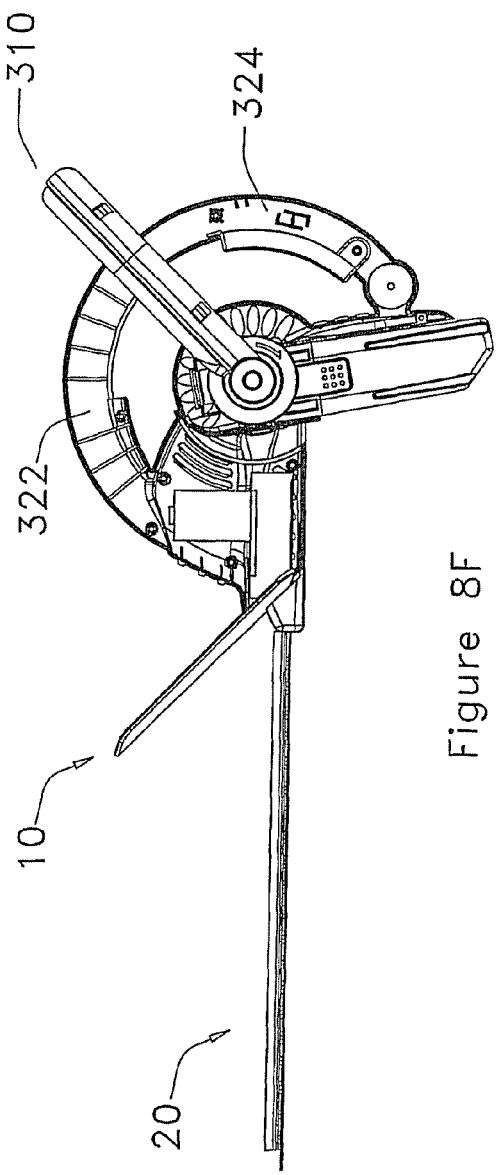
FIG. 8F depicts the hedge trimmer of FIG. 8A with the first handle at the fourth angular position.
Figure 11:
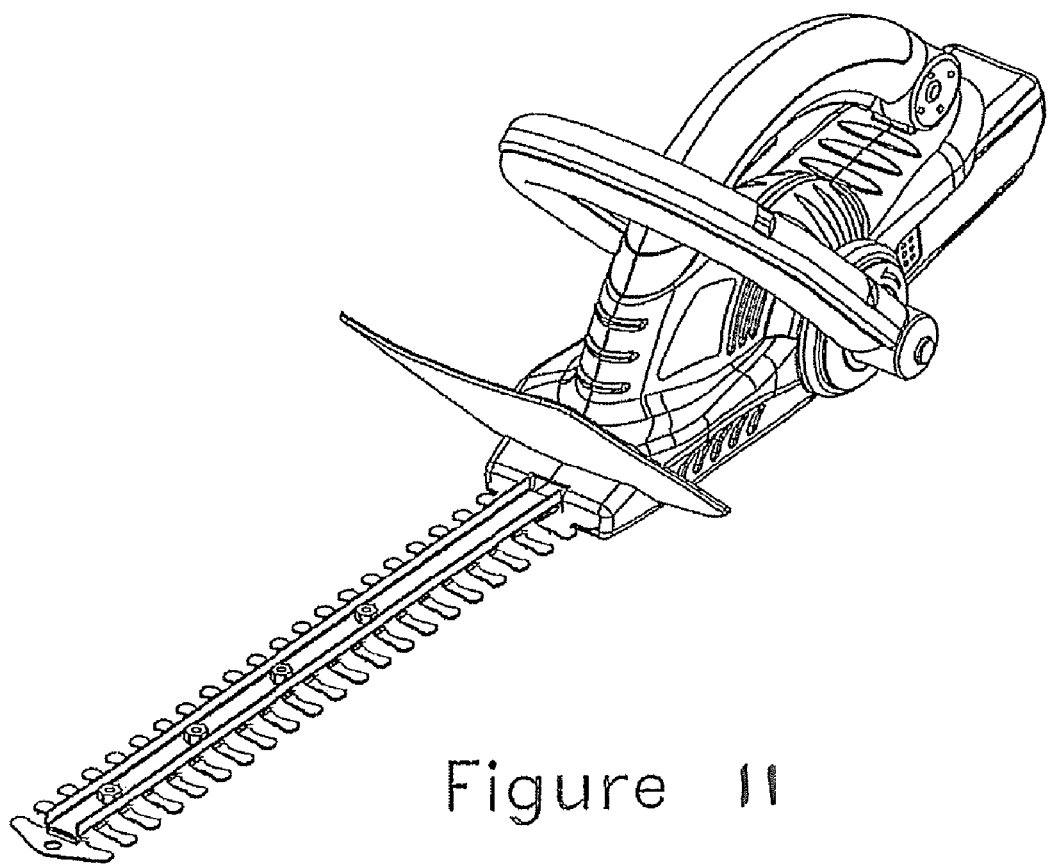
FIG. 11 shows a perspective view of a chain saw.
Figure 12:
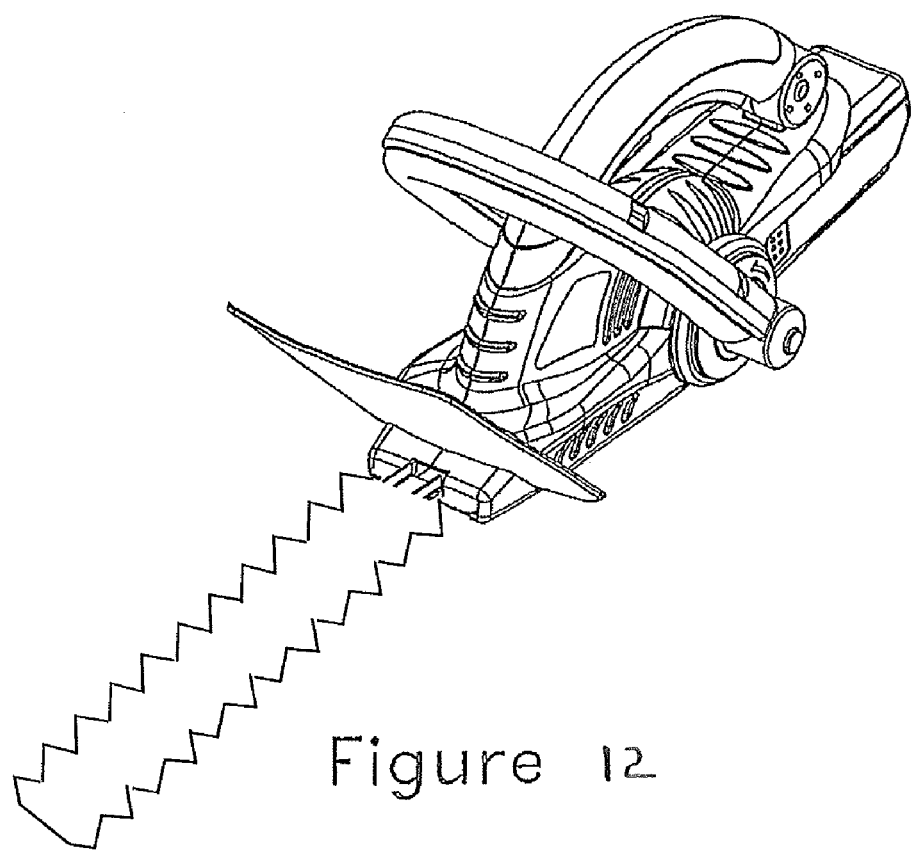
FIG. 12 shows a perspective view of a screw blade.
Figure 13:
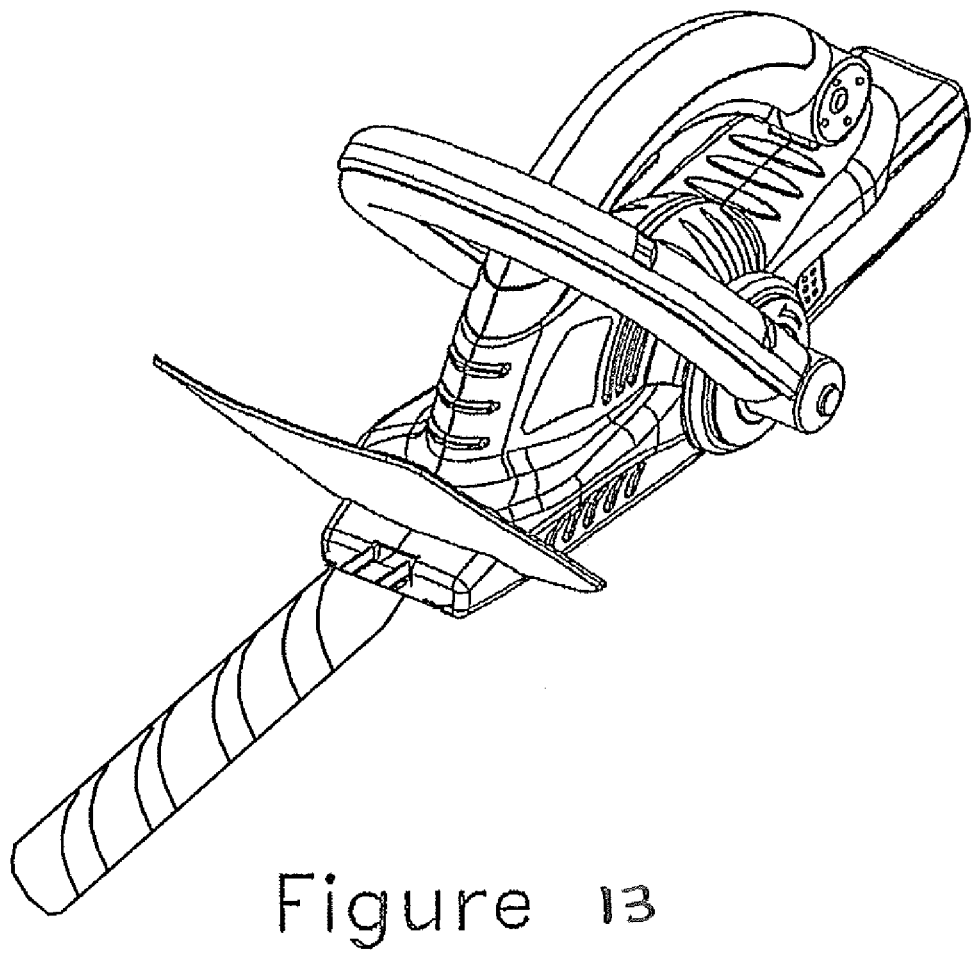
FIG. 13 shows a perspective view of a drill bit.

As is depicted in the various Figures, the second handle is disposed rearward of the first handle and comprises a hand grip portion, the vertical location of which relative to the hand-grip portion of the first handle is adjustable. In particular, the second handle comprises first 322 and second 324 arcuate hand-grip portions which are configured so that the overall arcuate length of the second handle is adjustable. For example, the second handle can be extended to the maximum length as shown in FIGS. 8D-8F, an intermediate length as shown in FIGS. 8A and 10, or retracted to the minimum length of FIGS. 1 and 8. The extendibility and retractability of the second handle is achieved in this example by having a first hollow arcuate portion into which the second hand-grip portion can fully retract and from which the second hand-grip portion can extend. It will be noted that the first and second hand-grip portions are of substantially the same length with both of the first hand grip portions and second hand grip portions being rotatable relative to a common axle.

With this arrangement, the second handle can be extended or retracted so that the preferred angular position of an effective hand-grip portion can be varied and set by a user. For example, in the configuration of FIG. 1, the first hand-grip portion will serve as the effective hand-grip, while in the configuration of FIG. 8B, the second hand-grip portion will serve as the effective hand-grip. Due to the arcuate shape of the second hand-grip portion and with its arcuate segment extending parallel to the longitudinal direction of the elongate cutting means, it will be noted that the inclination of this movable arcuate segment is also changed during rotation about the common axle. Due to rotation of the arcuate hand grip portion about the common axle in the first and fourth quadrants of FIG. 8A, the vertical and longitudinal separations between the hand-grip portions of the first and second handles will increase with anticlockwise movement of the second arcuate hand-grip portion until the arcuate portion moves into the forth quadrant. When the second arcuate hand-grip portion is moved in an anticlockwise direction, the vertical separation between the hand-grip portions of the first and second handles will decrease. Likewise, the longitudinal separation will decrease when the second arcuate hand-grip portion has crossed the longitudinal axis and moves into the forth quadrant.

It will be understood that the design of the second hand-grip portion in a manner that it can pivotally rotate about the common axle confers additional advantages to be explained below. For example, when the hedge trimmer is required to trim overhead hedges, a user will have to lift the hedge trimmer above his/her heads. For conventional hedge trimmers, the first and second handles are respectively fixedly located in the third and first quadrants. To negotiate overhead trimming, a user will have to operate a heavy hedge trimmer with both hands stretched upwardly, similar to a surrender posture, which could be awkward. On the other hand, with the pivotal arrangements of the present second hand-grip portion, the second hand-grip can be moved into the third quadrant, as shown in FIG. 8F, or a transition between the first and third quadrants, as shown in FIG. 8B. In such a configuration, the tilt-control hand (that is, the hand gripping the second handle) of a user can be bent so that the user can exercise better control on the hedge trimmer such that amount of titling can be more easily controlled with an enhanced degree of stability, especially stability relating to the direction of extension of the elongate cutting mean.

When the hedge trimmer is required to operate at a medium or low vertical level, the second hand-grip portion can be fully retracted into the hollow compartment of the first arcuate hand-grip portion in which case the first arcute hand-grip portion will become the effective hand-grip portion.

In this example, the second handle extends arcuately about the common axle 500 and along a track which is parallel to the longitudinal direction of extension of the elongate cutting means. The combination of a transversally extending first handle and a longitudinally extending second handle together form a pair of T-shaped handle assembly as depicted in the top plane view of FIG. 3. Such a T-shaped handle assembly provides an increased degree of mechanical control of the hedge trimmer but is by no means essential. Furthermore, a longitudinally extending arcuate shaped hand-grip portion is more ergonomical for overhand operation since it may be difficult for a user to grip a transversally extending hand-grip effectively during an overhead operation of a hedge trimmer.

As an alternative design, the second handle can be realised by means of a T-bar handle with the top hand-grip portion transversally extending, that is parallel to the hand-grip of the first handle, and the central bar pivotally connected to the chassis of the housing to facilitate pivotal movement of the transversal hand-grip portion about the common axle similar to the manner of operation described above.

By having a handle assembly comprising a combination of a first handle with a hand-grip portion which is pivotally movable about a handle axis and a second handle which is also pivotally movable, various combinations of handle configuration can be obtained to suit various application requirements.

In this specific example, the housing comprises a first housing portion 250 and a second housing portion 260 which are pivotally or hingedly joined together. As is depicted in FIGS. 8-10, the power drive arrangement is received within the first housing portion which is on one side of the hinge and from which the elongate cutting member protrudes distally away. The second housing portion comprises a battery receptacle for detachably mounting an elongate piece of rechargeable battery 270. The battery receptacle is designed so that a battery can be radially plugged into the battery receptacle with an exposed portion for easy removal, for example, for recharging.

As can be seen from the Figures, one longitudinal end of the movable first hand-grip portion is attached to the battery housing while the other end is coupled with the free end of the first arcuate grip portion of the second handle. Also, the other longitudinal end of the hand-grip portion of the second handle, which is distal from the second hand-grip portion, is fixedly attached to the housing, and more particularly, to the first housing portion.

By attaching the movable hand-grip portion of the second handle to the battery compartment, and because the weight of a battery constitute a significant proportion of the weight of the hedge trimmer, movement of the movable hand-grip portion of the second handle also changes the location of the instantaneous centre of gravity of the power tool which could be useful for providing additional weight for more efficiently tilting the elongate cutting means to the desired inclination.

In this example of a hedge trimmer, the cutting means comprises a pair of fish-bone shaped cutting members known to persons skilled in the art. More specifically, each cutting member comprises a plurality of transversally extending blades distributed on a longitudinally extending shaft. Relative longitudinal reciprocating movements between the pairs of cutting members provide the desirable cutting effects.

Furthermore, the first handle, the second handle and the second housing portion are pivotally movable about a common pivotal axle.

While the present invention has been explained by reference to the examples or preferred embodiments described above, it will be appreciated that these are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to a hedge trimmer, it should be appreciated that the invention can apply, whether with or without modification, to other power tools, such as saws including chain saws, drills, vegetation pruning device, power wrenches and like without loss of generality. When the invention is applied to other types of power tools, reference to a hedge trimmer should be changed to a power tool mutatis mutandis, reference to a cutting means should be changed to a movable head, and reference to a linear reciprocating motion should be changed to a rotary reciprocating motion where appropriate or when required by the context.

The invention claimed is:

1. A power tool comprising:
   a working member power coupled to a power drive arrangement held by a housing, said housing comprising a front housing portion from which said working member protrudes and a rear housing portion pivotally connected to said front housing portion;
   a first handle comprising a first hand-grip portion adapted for a user to hold said power tool at an operative level above ground level; and
   a second handle adapted for a user to generate the turning moment about said first handle so as to vary inclination of said working member relative to the ground level, said second handle comprising a movable hand-grip portion which is attached to said rear housing portion;
   said movable hand-grip portion of said second handle being arranged to pivotally move said rear housing portion relative to said front housing portion wherein the hand-grip portion of said first handle is on an upper side of said front housing portion, and said movable hand-grip portion of said second handle is movable above and below said front housing portion.

2. A power tool according to claim 1, wherein said power drive arrangement comprises a front portion and a rear portion which are respectively housed by said front housing portion and said rear housing portion.

3. A power tool according to claim 2, wherein, said front and rear portions of said power drive arrangement are pivotally joined and share a common pivotal axis with said rear housing portion.

4. A power tool according to claim 1, wherein the power drive arrangement held by the housing comprises:
   a portable power source held by said rear housing portion; and
   a power driving mechanism operable by said portable power source held by said front housing portion.

5. A power tool according to claim 4, wherein said portable power source is a battery providing a counterweight against the weight of said power driving mechanism and said working member, said movable hand-grip portion being arranged to vary the longitudinal distance of said counterweight relative to a pivotal axis of said housing.

6. A power tool according to claim 1, wherein said working member is elongate and said power drive arrangement is arranged for reciprocatingly driving said working member.

7. A power tool according to claim 1, wherein said working member is an elongate cutting element having a longitudinal axis, said cutting element selected from the group consisting of a chain saw, a saw blade, and a drill bit.

8. A power tool according to claim 1, wherein said movable hand-grip portion of said second handle is pivotally connected to said rear housing portion at a location near the rear end of said rear housing portion, a pivotal axis of said movable hand-grip portion of said second handle and a pivotal axis of said rear housing portion being parallel to each other and said pivotal axis of said movable hand-grip portion and said pivotal axis of said rear housing portion each being orthogonal to the longitudinal axis of said tool.

9. A power tool according to claim 1, wherein said second handle comprises a fixed handle portion extending arcuately from said front housing portion towards said rear housing portion, said movable hand grip portion being arcuate and extendible relative to said fixed handle portion.

10. A power tool according to claim 9, wherein said arcuate fixed handle portion and said arcuate movable hand grip portion of said second handle share a common plane and a common centre, said common centre coinciding with a pivotal axis of said rear housing portion.

11. A power tool according to claim 9, wherein said arcuate movable hand-grip portion of said second handle is telescopically extendible from said fixed handle portion.

12. A power tool according to claim 1, wherein said second handle extends longitudinally from said front housing portion to said rear housing portion.

13. A power tool according to claim 1, wherein said rear housing portion is elongate and said movable hand-grip portion of said second handle is arranged to vary the inclination of said rear housing portion relative to the longitudinal axis of said working member.

14. A power tool according to claim 1, wherein said first hand-grip portion of said first handle extends transversely across said housing.

15. A power tool according to claim 1, wherein said first handle is pivotally mounted on said rear housing portion.

16. A power tool according to claim 15, wherein said rear housing portion and said first handle share a common pivotal axis.

17. A power tool according to claim 1, wherein said first handle defines a first handle plane and said second handle defines a second handle plane, said second handle plane being orthogonal to said first handle plane.

18. A power tool according to claim 17, wherein said working member has a longitudinal axis, said longitudinal axis of said working member being on said second handle plane.

19. A power tool according to claim 1, wherein said first handle comprises a laterally extending hand-grip member.

* * * * *